(12) United States Patent
Hansen

(10) Patent No.: US 8,245,800 B2
(45) Date of Patent: Aug. 21, 2012

(54) APPARATUS FOR CONVERTING A WHEELED VEHICLE TO A TRACKED VEHICLE

(75) Inventor: Ronald S. Hansen, Kindred, ND (US)

(73) Assignee: Vermeer Manufacturing Company, Pella, IA (US)

( * ) Notice: Subject to any disclaimer, the term of this patent is extended or adjusted under 35 U.S.C. 154(b) by 712 days.

(21) Appl. No.: 12/330,689

(22) Filed: Dec. 9, 2008

(65) Prior Publication Data
US 2010/0139994 A1 Jun. 10, 2010

(51) Int. Cl.
*B62D 55/04* (2006.01)
(52) U.S. Cl. ...... 180/9.26; 180/9.3; 180/9.28; 180/9.21; 305/120
(58) Field of Classification Search ........... 180/9.21, 180/9.26, 9.28, 9.3; 305/120
See application file for complete search history.

(56) References Cited

U.S. PATENT DOCUMENTS

| 5,954,148 A * | 9/1999 | Okumura et al. ............ 180/9.21 |
| 2005/0252592 A1 * | 11/2005 | Albright et al. ............ 152/379.3 |

* cited by examiner

*Primary Examiner* — Lesley D Morris
*Assistant Examiner* — Jacob Knutson
(74) *Attorney, Agent, or Firm* — Merchant & Gould P.C.

(57) ABSTRACT

The invention relates to a self-propelled, wheeled vehicle that may be converted into a multi-track self-propelled vehicle using one or more track assemblies. Each track assembly includes a carriage with a main frame that support forward and rearward idler wheels and a plurality of centrally located, inner bogey wheels, and an outrigger beam that supports a plurality of centrally located, outer bogey wheels. One of the idler wheels is movably connected to the main frame and is movable by an actuator. The carriage is removably connected to a spindle of a vehicle by an attachment assembly. The attachment assembly includes a first or lower section and a second or upper section that generally encircle a portion of the spindle housing, and which are connected thereto by a plurality of fastening elements. A sprocket is operatively connected to a wheel hub of the spindle either directly or indirectly by way of a spacer element. A flexible endless track is entrained about the idler wheels, the bogey wheels and the sprocket.

27 Claims, 8 Drawing Sheets

FIG.11
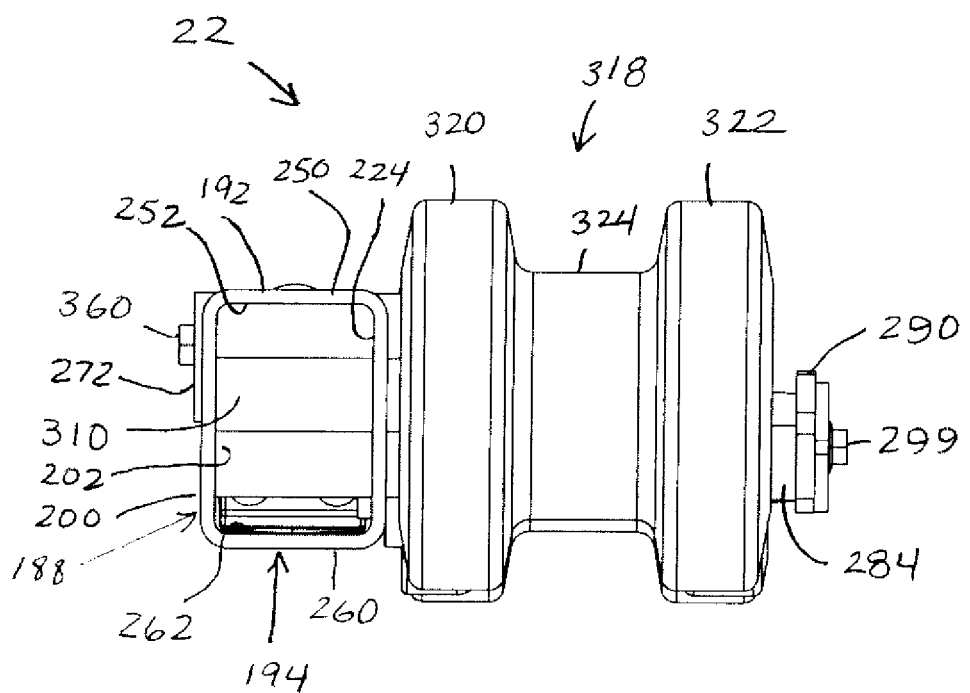
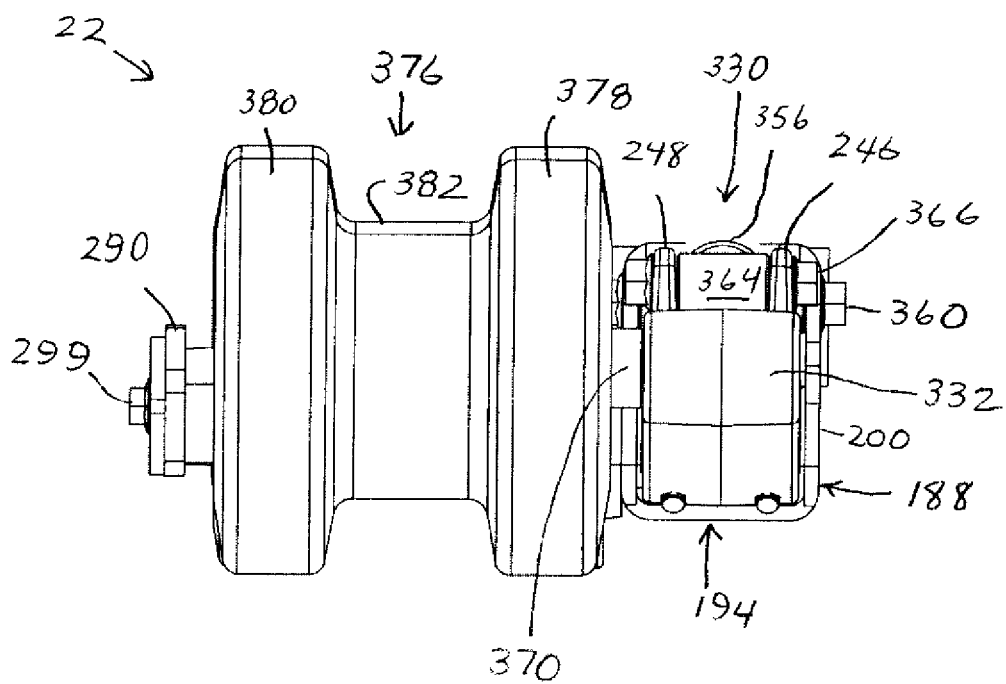
FIG.12

APPARATUS FOR CONVERTING A WHEELED VEHICLE TO A TRACKED VEHICLE

FIELD OF THE INVENTION

This application relates to wheeled vehicle to a tracked vehicle. More specifically, this application relates to track assemblies that may be used to convert a self-propelled tire or wheel supported vehicle to self-propelled multi-track vehicle.

BACKGROUND

Self-propelled, wheeled, multi-purpose vehicles are old and well known in the art. Such-vehicles were originally designed to perform a variety of tasks that were commonly handled by cranes, hoists, tractors, trailers, and other specialized equipment. Such vehicles most often take the form of a steerable, wheeled chassis that is equipped with a boom that can be raised, extended and/or retracted. The end of the boom may be provided with one or more attachments, such as a pallet fork, a basket, bucket, etc. as the situation arises. These vehicles are typically used at construction sites and/or other off-road areas, where the ground upon which they traverse has not be surfaced or otherwise prepared. Often, the ground is not capable of supporting the weight of the self-propelled tire or wheel supported and they can become mired and/or lose traction. If the vehicle becomes mired or stuck, it is unable to be productive. If the vehicle cannot be extricated by the driver, additional equipment and personnel will have to be drawn away from other projects to provide assistance. If a vehicle was carrying a load at the time, the remedy becomes more complicated. Loads can shift and fall. In addition, a repositioned load can change the location of the center of gravity so that it and the vehicle are in an unstable position.

It will be appreciated from the foregoing, therefore, that prior art self-propelled wheeled vehicles present problems that are in need of solutions and there is a need for a vehicle that is able to be used in conditions that would not otherwise be possible.

SUMMARY

In a preferred embodiment, an apparatus converts a wheeled vehicle to a tracked vehicle. The apparatus includes a track system that is configured and arranged to be attached to existing wheel hubs of a vehicle such as construction equipment, preferably telehandlers and boom lifts. The track assembly unit includes a carriage having a main frame, a pair of struts that extend transversely from one side of the main frame, and an outrigger beam that is attached to the ends of the struts. A plurality of wheels is rotatably mounted to the carriage. More specifically, a first idler wheel is mounted at a first end of the carriage and a second idler wheel is mounted at a second end of the carriage. One of the idler wheels may be adjustably mounted to the carriage so that the tension on an endless track can be varied. The carriage includes two sets of bogey wheels that are located between the rotational axes of the idler wheels. One set of bogey wheels are mounted on the main frame and the other set of bogey wheels are mounted on the outrigger beam. The main frame includes a sleeve that extends transversely to the longitudinal axis of the main frame, with the sleeve having an interior configured to receive a pin that is used to connect the carriage to an attachment assembly.

A preferred embodiment of the attachment assembly includes first and second (or lower and upper) sections that can be attached to a vehicle axle, more specifically, the spindle housing of a vehicle axle. The lower and upper sections of the attachment assembly can be connected to existing lower and upper trunnions, respectively. The lower and upper sections of the attachment assembly include inner edges that are able to contact the outer surface of the spindle housing. The lower section of the attachment assembly includes a pair of downwardly extending flanges, each of which includes a transverse aperture, with the transverse apertures able to receive a pin used to connect the lower section to a main frame of the carriage. The flanges of the lower section enable the wheels of the carriage to be positioned below the wheel hub of a vehicle. In addition, the flanges position the lower section below the spindle housing so that the carriage is able to rotate about the pivot pin connection. More specifically, the lower section includes forward and rearward extending wings that extend away from each other in upwardly divergent directions. The bottom surfaces of the wings are configured and arranged so as to be able to contact front and rear portions of the main frame of a carriage as it pivots back and forth. The angle of rotation is on the order of plus or minus 10-15 degrees, relative to the lower attachment section. The track assembly of the present invention may include one or more limiter bars or stop plates that are attached to the lower section of the attachment assembly. In use, the limiter bars or stops can modify or otherwise restrict the available angle of rotation between the carriage and the lower section of the attachment assembly.

In a preferred embodiment, the adjustable idler wheel of the carriage is mounted at the front end of the main frame and it is operatively connected to a tensioning apparatus or mechanism. More specifically, the idler wheel is rotatably attached to a shaft that is connected to one end of a pivot arm. The other end of the pivot arm is rotatably mounted to a transversely oriented strut that extends through the main frame. A tensioning mechanism is operatively connected to the pivot arm and the main frame and includes an expandable/retractable force exerting member such as a grease cylinder, hydraulic cylinder, spring element, or the like. In use, the force exerting member rotates the pivot arm about the strut, in backward and forward motion that raises and lowers the idler wheel. The tensioning mechanism is able to absorb impacts when the tracked vehicle encounters an object on the ground while in operation. For example, when the front end of the track assembly encounters an immovable object in the tracked vehicle's path, the forwardmost idler wheel will tend to be pushed upwardly and to a lesser extent, rearwardly and the force exerting member will be momentarily compressed. In the absence of the immovable object, the force exerting member will both urge the forwardmost idler back to its normal operating position.

The apparatus of this application includes a sprocket that can be attached directly to a wheel hub or to a spacer element that is interposed between the wheel hub and the sprocket. The sprocket includes a plurality of circumferential apertures that are configured and arranged to engage projections that extend inwardly from an inner surface of an endless track. As will be appreciated, other sprockets with different track engaging surfaces may be used, dependent upon the particular endless track configuration used in the track assembly. For example, a sprocket may have radially extending teeth that engage apertures in an endless track.

The track assemblies can be used to convert a wheeled vehicle into a tracked vehicle. They provided a simplified track tensioning mechanism, and can be easily accessed, serviced and/or replaced.

The track assemblies can be attached to a vehicle without having to make any modifications to the vehicle.

An advantage of the track assemblies is that a portion of the assembly can be connected to an axle and the remainder of the track assembly removed or attached as desired.

Another advantage is that the track assemblies may be attached to a wide variety of vehicles.

These and other objectives, features and advantages will appear more fully from the following description, made in conjunction with the accompanying drawings wherein like reference characters refer to the same or similar parts throughout the several views. And, although the disclosure hereof is detailed and exact, the physical embodiments herein disclosed are merely examples that may be embodied in other specific structures. While preferred embodiments have been described, the details may be changed without departing from the claims.

DESCRIPTION OF THE DRAWINGS

FIG. 11 is rear elevational view of the carriage of FIG. 7;

FIG. 12 is a front elevational view of the carriage of FIG. 7; and,

DETAILED DESCRIPTION

Figure 1:
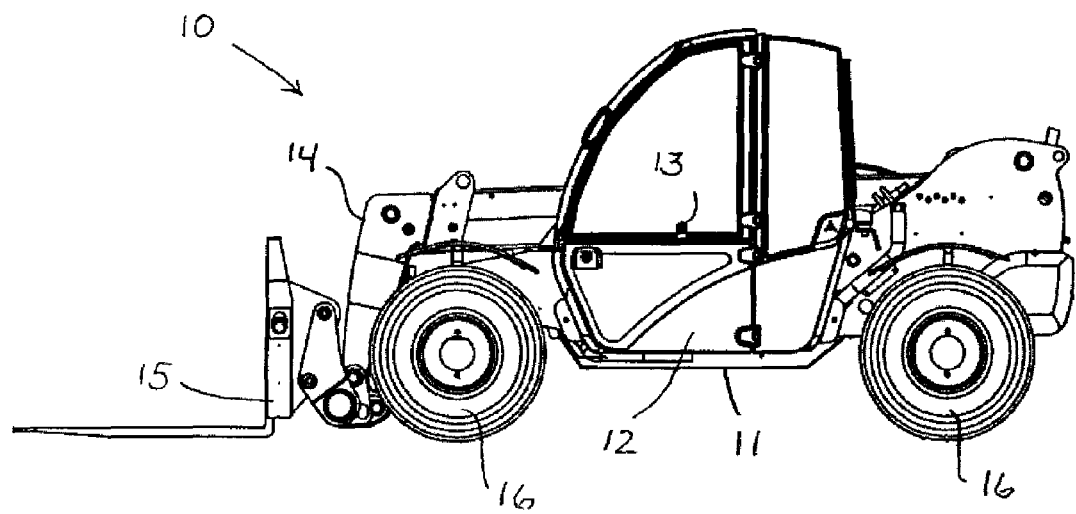
FIG. 1 is a side elevational view of a known, prior art wheeled vehicle.
Figure 2:
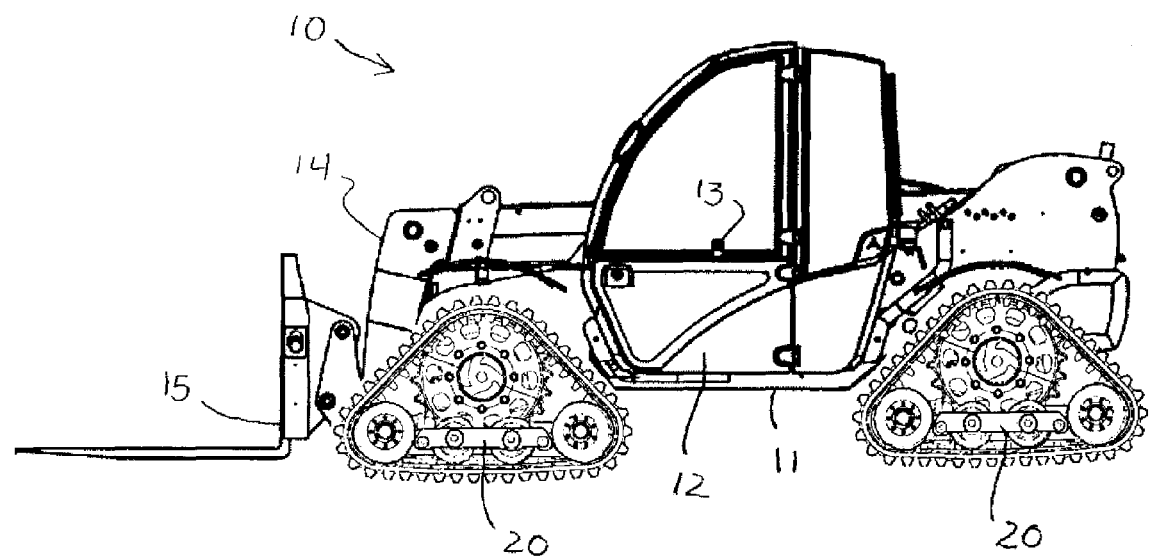
FIG. 2 is the vehicle of FIG. 1 in which the support wheels have been removed and the vehicle has been modified with one or more track assembly units.

Referring initially to FIG. 1, a side elevation of a known prior art self-propelled, wheeled vehicle 10 is shown. The typical prior art vehicle 10 generally comprises a chassis 11 that has a body 12, driver controls 13, and a motive source that is used to supply power to a plurality of wheels or tires 16, some of which may be steerable. The motive source is also generally used to supply power to a boom 14 so that it may be raised and lowered, rotated, and extended/retracted. The end of the boom 14 is generally provided with a multi-functional working end 15, but it may also be provided with specialized tools and/or attachments, as needed. Each wheel or tire 16 is attached to a conventional, flanged wheel hub 52, which is connected to an axle 40 (see FIG. 3). Referring to FIG. 2, the wheels 16 of a prior art vehicle 10 of FIG. 1 have been removed and replaced with track assemblies 20. As will be discussed in greater detail below, each track assembly 20 generally includes a wheeled carriage 22, an attachment assembly 24, a spacer element 26, a sprocket 28, and an endless track 34.

Figure 3:
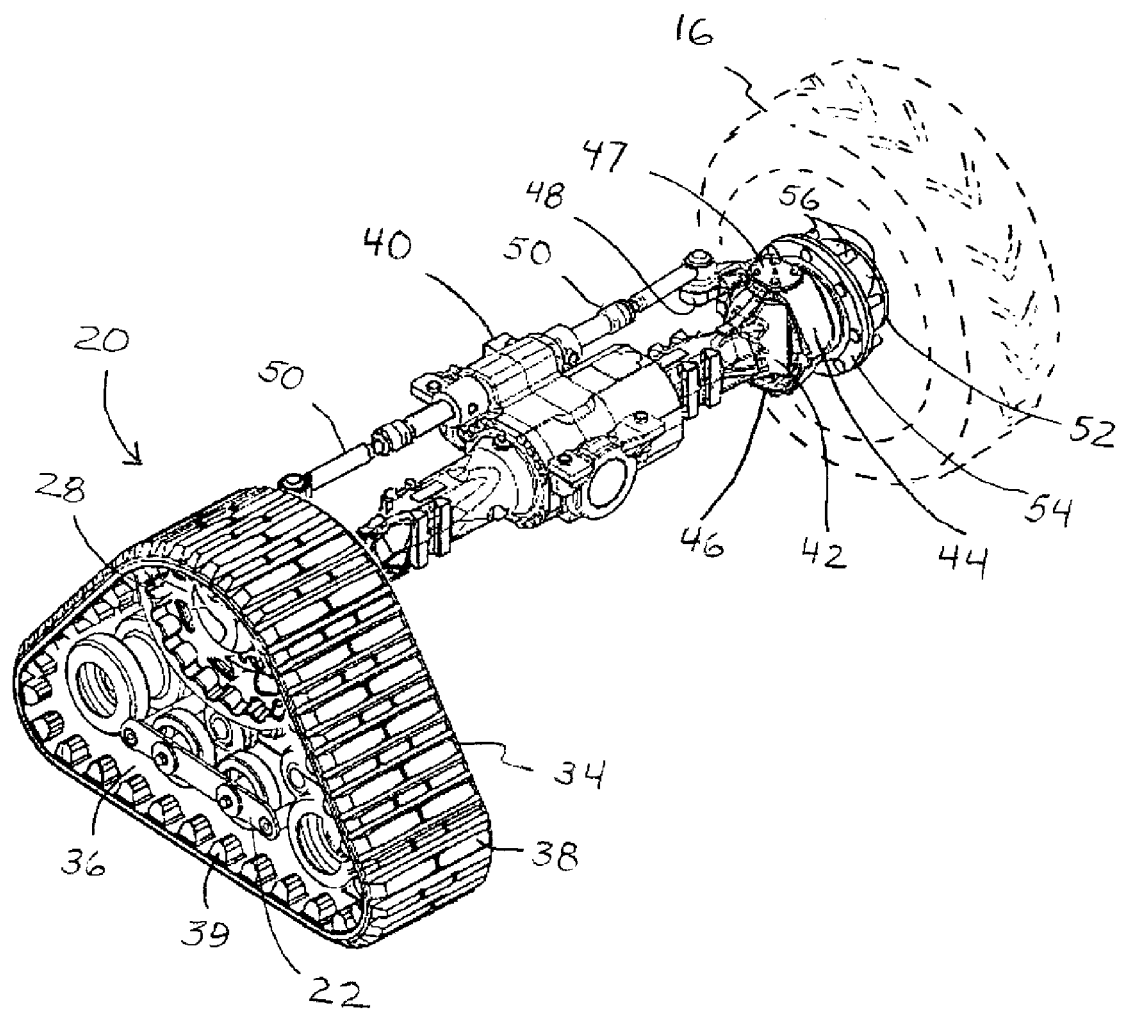
FIG. 3 is a perspective view of a front axle of a vehicle that has been partially modified with a track assembly unit, the view looking down from the in front of and to the right of the axle.

Now referring to FIG. 3, an axle 40 of the type that can be used with a pair of track assemblies. Each end of the drive axle 40 includes an axle housing with a yoke 42 and a spindle housing with a yoke 44. The axle housing yoke 42 and the spindle yoke 44 are rotatably connected to each other by lower and upper trunnions 46, 47. Each spindle housing 44 includes a knuckle 48 that extends from the exterior and which is connected to a steering arm 50. The drive axle 40 also includes drive shafts (not shown) that are connected via universal joints (not shown) to wheel hubs 52. As shown, a wheel 16 (shown in phantom) is attached to a wheel hub 52 of the type having a flange 54 and fastening elements, such as threaded studs 56 and nuts 58. The right front wheel has been replaced by a track assembly 20 that includes a carriage 22 with support wheels, a sprocket 28 and an endless track 34 having an interior surface 36, an exterior surface 38 and inwardly extending projections 39. The endless track also includes a second set of inwardly extending projections (not shown) that are configured to be engaged by the sprocket.

Note that the carriage 22 is positioned below and in substantial alignment with the wheel hub 52 and the carriage is cantilevered outwardly relative to the attachment assembly 24. Note that because the attachment assembly 24 does not interfere with the operation of the wheel hub 52, it need not be removed. This permits a user to connect one or more attachment assemblies to a vehicle and switch between wheels and tracks, as needed or required. In addition, it is envisioned that the attachment assemblies can have separate utility. For example, they could be used as anchor points to tie a machine to a structure such as a transport trailer. They could also be used as attachment points for other transport devices such as skis.

Figure 4:
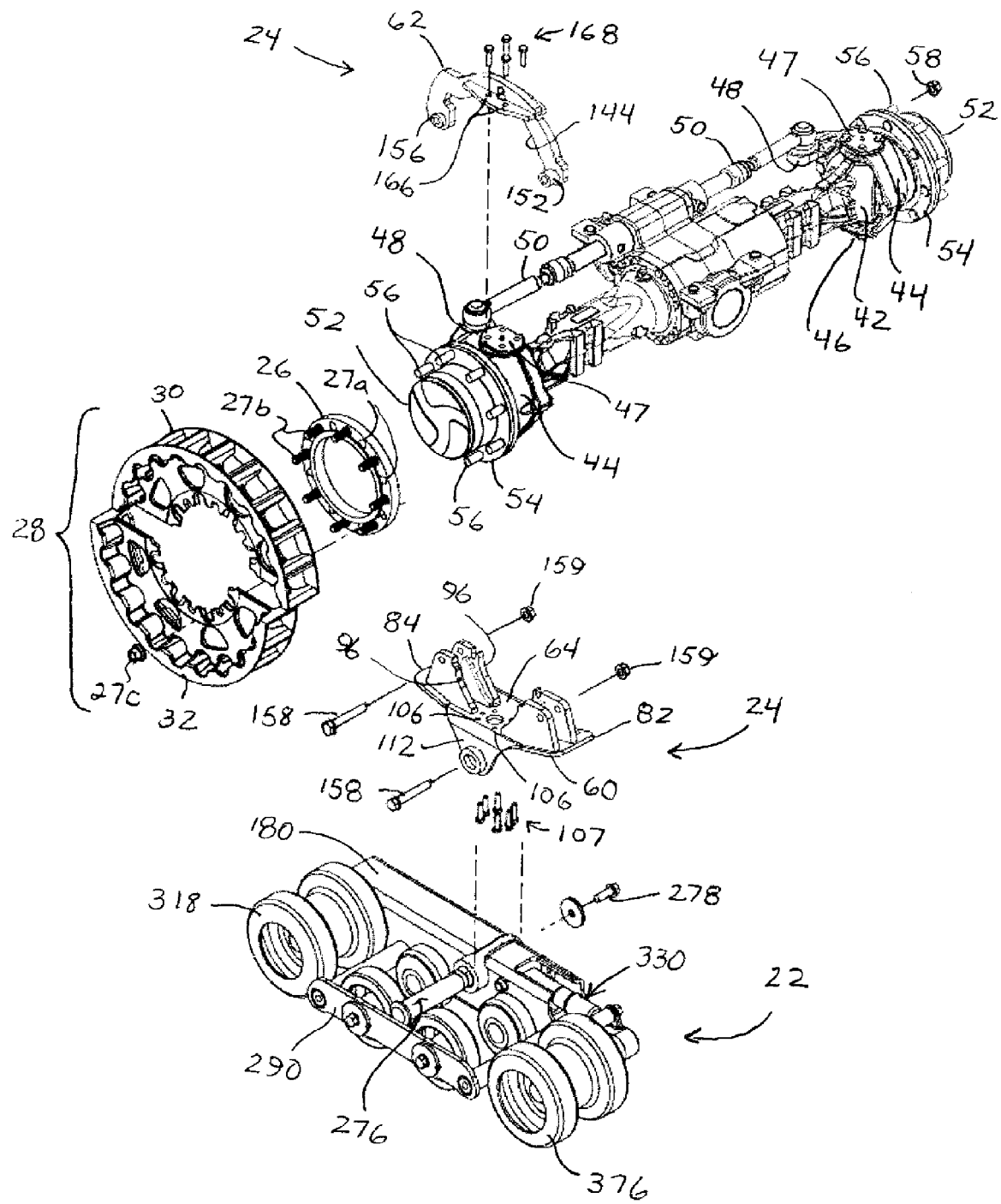
FIG. 4 is a partial, exploded view of FIG. 3.

A partially exploded view of the major components of the track assembly 20 can be seen in FIG. 4. Here, the endless track 34 has been omitted for clarity. Beginning with right front end of axle 40, the attachment assembly comprising lower 60 and upper 62 sections, is positioned below and above the spindle housing 44. As will be discussed later in greater detail, the lower section 60 of the attachment assembly 24 has a plurality of stanchions with inner edges 96 that closely match the contours of a portion of the exterior surface of the spindle housing 44 about which it is positioned.

The lower section 60 may be connected to a lower trunnion 46 using existing trunnion bolts 107. To install, existing trunnion bolts 107 are removed, the lower section 60 of the attachment assembly 24 is positioned onto the spindle housing 44 from below, and the trunnion bolts 107 are inserted through apertures 106 in the lower section 60 and tightened.

The upper section 62 of the attachment assembly 24 is generally arcuately shaped and has an internal or inner edge 144 that closely matches the contours of a portion of the exterior surface of the spindle housing 44 about which it is positioned. As will be discussed later in greater detail, the upper section 62 may be connected to an upper trunnion 47. To install, existing trunnion bolts 168 are removed, the upper section 62 of the attachment assembly 24 is positioned onto the spindle housing 44 from above, and the trunnion bolts 168 are inserted through apertures 166 in the upper section 62 and tightened.

The lower and upper sections 60, 62 of the attachment assembly 24 are secured to each other by transverse fastening elements 158, 159 such as threaded nuts and bolts. An important feature of the lower section 60 is the parallel, downwardly extending flanges 110, 112. As will be discussed below in greater detail, the flanges 110, 112 are sized to receive a main frame 180 of a carriage 22 therebetween.

Moving towards the left of the wheel hub 52, there is a ring-shaped spacer element 26 and a sprocket 28 comprising segments 30 and 32. The spacer element 26 may be interposed between wheel hub flange 54 and the sprocket 28, if needed. The spacer element 26 is used to connect the track assembly 20 to the existing wheel hub 52 of a vehicle. To that end, the spacer element 26 includes a first set of apertures 27A that correspond to the fastening elements 56, 58 of the wheel hub 52 a vehicle, and a set of outwardly extending, peripheral fastening elements 27B, such as threaded studs 27B and nuts 27C, that correspond to apertures to the sprocket 28 of the track assembly. As will be understood, the apertures 27A and fastening elements 27B may differ in terms of numbers and patterns, depending upon the particular vehicle to which a track system is to be attached and the particular type of sprocket is being used. Alternatively, the spacer element may be integrally formed with the sprocket or sprocket segments. As will be appreciated, the particular sprocket used with the attachment assembly may vary. For example, the sprocket may include outwardly extending teeth that engage apertures in an endless track. Alternatively, the sprocket may include peripheral apertures that engage projections that extend inwardly from an endless track.

A preferred sprocket 28 comprises two sprocket segments 30, 32, with each sprocket segment 30, 32 comprising an arcuately shaped plate having inner and outer circumferences. A plurality of bars is evenly spaced about the outer circumference in a transverse orientation and the ends of the bars are connected by side walls or rims. The bars and side walls define openings or gaps that receive and engage inwardly extending projections 37 of a flexible track 34. The plate also includes a plurality of slots or apertures spaced evenly about and adjacent to the inner circumference, with the slots or apertures configured to be aligned with the threaded studs that extend from either the spacer element 26 or the wheel hub 52.

Figure 5:
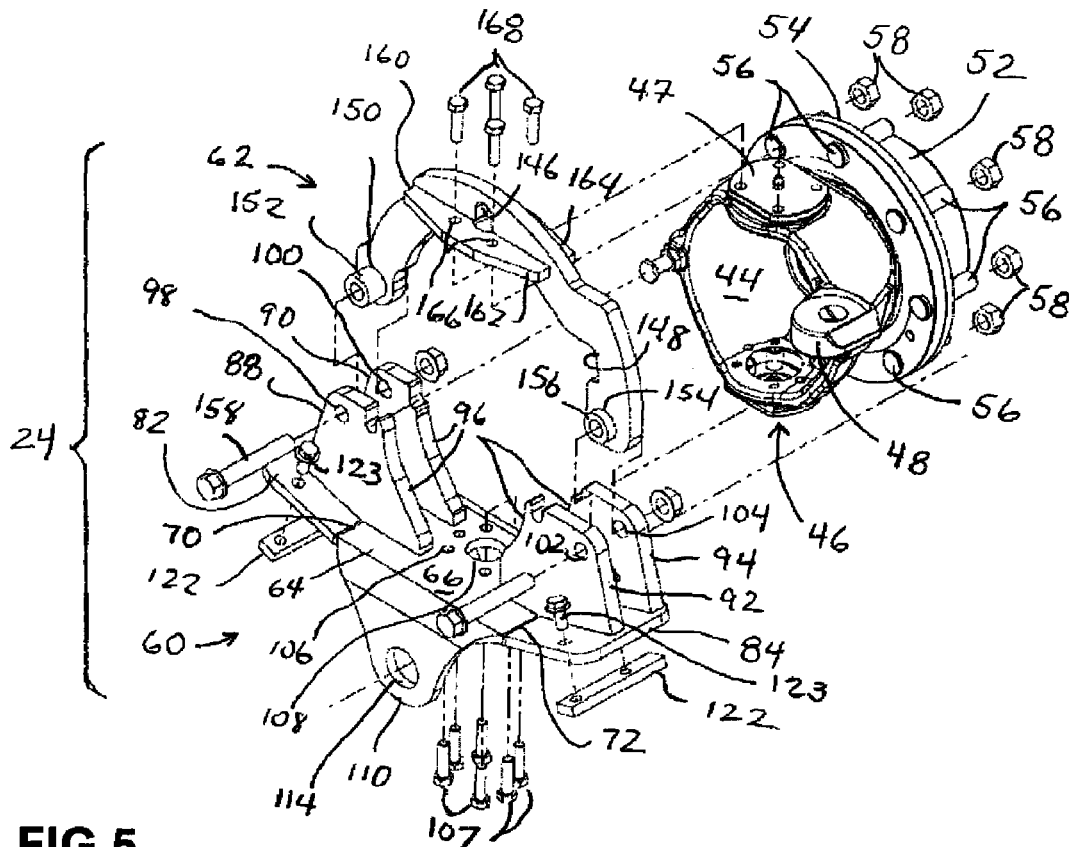
FIG. 5 is a perspective view of the attachment assembly and spindle housing, the view from behind and inboard from the spindle housing.
Figure 6:
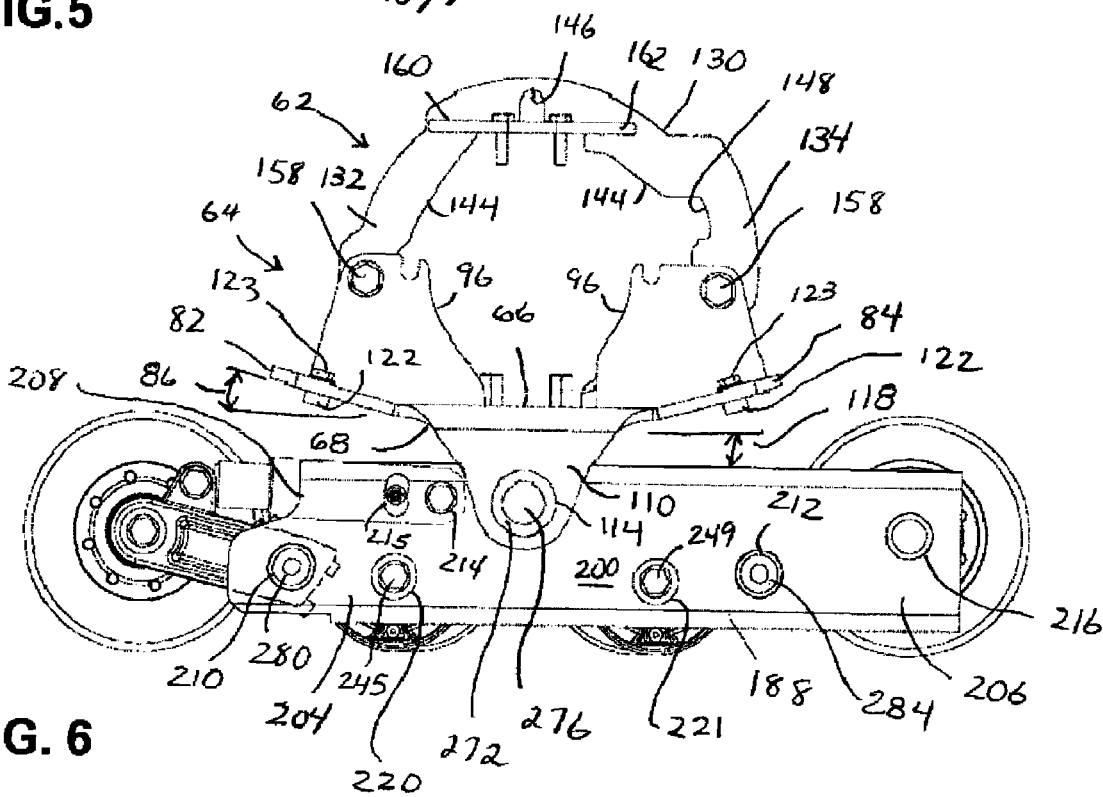
FIG. 6 is a partial, inboard view of the carriage connected to the attachment assembly of FIG. 5.
Figure 7:
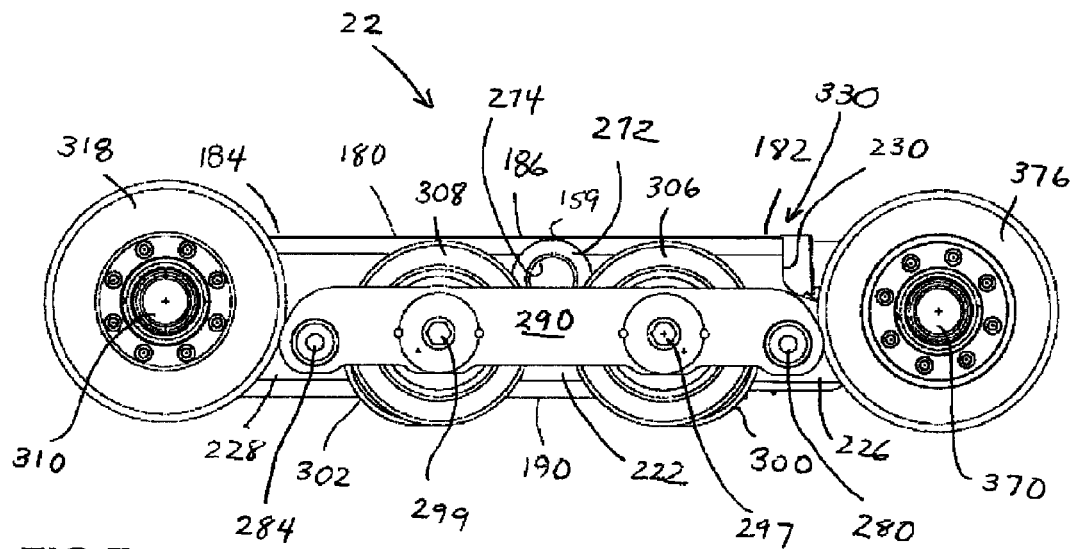
FIG. 7 is an outboard side elevational view of a carriage.

A partially exploded perspective view of the attachment assembly 24 and a spindle housing 44, with the view taken from the rear and inside looking towards the front and right is depicted in FIG. 5. An inboard elevational view of the carriage 22 and the attachment assembly 24 connected thereto, is depicted in FIG. 6. Note, in FIG. 6, that the spindle housing 44, to which the attachment assembly 24 would be connected, has been omitted to facilitate a better understanding of the invention. In a preferred embodiment, the attachment assembly 24 comprises two components, a first or lower section 60, and a second or upper section 62. The first or lower section 60 comprises a body or base 64 having an upper surface 66 and a lower surface 68, opposing forward and rearward ends 70, 72, opposing sides and a center section. An extension or wing 82, 84 is connected at each end 70, 72, preferably at an angle, so that the wings project forwardly and rearwardly from the body 64 in divergent, ascending directions. The wings 82, 84 are configured and arranged to engage the top surface 250 of the top wall 192 of main frame 180. This allows the main frame 180 to pivot back and forth as the track assembly traverses a non-planar surface.

A plurality of spaced-apart stanchions or posts 88, 90, 92, 94 are attached to the front and rear extensions or wings 82, 84. The stanchions 88, 90, 92, 94 are plate-like and their bases extend from the free ends of the extensions 82, 84 towards positions that are adjacent the center section of the base 64. All of the stanchions 88, 90, 92, 94 are generally vertically oriented and each stanchion or post 88, 90, 92, 94 includes an inwardly facing, generally arcuately shaped surface 96 that is configured to contact a portion of a spindle housing 44. Note that the inwardly facing surfaces 96 of the stanchions 88, 90, 92, 94 need not have the same configuration because spindle housings 44 can have different exterior surface profiles. An upper, free end of each stanchion 88, 90, 92, 94 includes a transverse aperture 98, 100, 102, 104 that is configured to receive a fastening element 158 used to connect the first or lower section 60 to a second or upper section 62 of the attachment assembly 24. The stanchions or posts 88, 90, 92, 94 and the body or base 64 form a cradle-like structure that receives a lower portion of a vehicle spindle 44.

The first or lower section 60 of the attachment assembly 24 is removably connected to a bottom portion of a spindle 44 of a vehicle by way of fastening elements, more specifically, the fastening element 107 that are normally used in a lower trunnion 46. To attach the lower section 60 to a spindle housing 44, the fastening elements 107 of the lower trunnion 46 are temporarily removed, the lower section 60 of the attachment assembly 24 will be moved into position from below, and the fastening elements 107 are inserted into small apertures 106 in the center section of the base or body 64, which are in alignment with the apertures in the lower trunnion 46. The small apertures surround a larger aperture 108 that serves as a relief for the trunnion pin itself.

A pair of downwardly depending flanges 110, 112 are connected to the sides of the body or base 64. A lower, free end of each flange 110, 112 includes a transverse aperture 114, 116 that is configured to receive a pivot pin 276 that is used to connect the attachment assembly 24 to the carriage 22. The flanges 110, 112 position the bottom surface 68 of the base or body 64 above the top surface 250 of the main frame 180 of the carriage 22 so that the carriage can rotate with respect to the attachment assembly 24. The track assembly 20 can rotate with respect to the axle 40 (i.e., the range or degrees of rotational motion relative to the vehicle to which it is attached), up to approximately 25 degrees plus or minus; more, if desired. Optionally, limiter bars or stops 122 may be attached to the bottom surfaces of the wings 82, 84 by fastening elements 123. As will be understood, the limiter bars or stops 122 can change the amount of rotation that is available to the carriage 22.

A preferred second or upper section 62 of the attachment assembly 24 includes an arcuately shaped body 130 having a first or front end 134, a second or rear end 136, side surfaces, an external edge, an internal edge 144, and a transverse plate 160. The first and second ends 134, 136 are connected to the stanchions 88, 90, 92, 94 of the first or lower section 60. The internal or interior edge 144 of the upper section 62 includes an upwardly extending slot 146 and a side notch 148. The slot 146 and the notch 148 provide relief for elements of the spindle housing 44. The transverse plate 160 is located at the uppermost portion of the internal or interior edge 144 and is generally horizontally oriented. The plate 160 includes a pair of flanges 162, 164 that extend outwardly from the sides of the upper section, with each flange including one or more vertically aligned apertures 166 that are used to attach the upper section to a vehicle spindle 44. The second or upper section 62 is removably connected to a spindle 44 of a vehicle by way of fastening elements 168 that are normally used in a upper trunnion 47. The fastening elements 168 of the upper trunnion 47 are temporarily removed, the upper section 62 is positioned from above onto the spindle housing 44. The fastening elements 168 are inserted into the small apertures 166, which are in alignment with the upper trunnion 47 apertures, and tightened. The small apertures 166 surround a larger aperture 170 in the transverse plate 160 that serves as a relief for the trunnion 47.

To facilitate connecting the upper section 62 to the lower section 60, each end 134, 136 of the upper section 62 is provided with transverse apertures 150, 154, that receive transverse sleeves or bushings 152, 156. The sleeves or bushings 152, 156 at each end of the section 62 are positioned between corresponding stanchions 88, 90, and 92, 94 so that the apertures of the sleeves 152, 156 are aligned with the transverse apertures 98, 100, and 102, 104 of the stanchions 88, 90, 92, 94. Fastening elements 158 are inserted into the aligned apertures of the lower and upper sections 60, 62 to secure them together. The attachment assembly 24 does not interfere with the normal operation of a wheel 15 and once an attachment assembly has been connected to a vehicle axle 40, it may remain there so as to enable a user to easily and rapidly convert a vehicle from a wheel drive to a track drive and vice-versa.

After the attachment assembly has been connected to a vehicle spindle housing 44, the carriage 22 can be connected to the attachment assembly 24 by positioning the main frame 180 of the carriage between the downwardly depending flanges 110, 112 of the lower section 60 of the attachment assembly, aligning the transverse apertures of the main frame 180 and the downwardly depending flanges 114, 116, inserting the pivot pin 276 through the aligned apertures and finally securing the pivot pin 276 with a conventional fastening element 278 such as a washer and a treaded bolt.

Once the carriage 22 has been connected to the spindle 44, the sprocket 28 can be connected to the existing wheel hub 52. As shown, a spacer element 26 is interposed between the existing wheel hub 52 and the sprocket 28. The spacer element 26 is preferably in the form of a ring having a predetermined thickness defined by inner and outer surfaces and a width defined by an outside diameter and an inside diameter. The ring also includes a plurality of apertures or through holes 27A that extend from the inner to the outer surfaces, and which are configured and arranged so that they are able to receive threaded studs 56 of an existing wheel hub 52. In addition, the ring includes a plurality of threaded studs 27B that are attached to and which extend away from the outer surface of the ring. The threaded studs 27b are configured and arranged to operatively connect the sprocket 28 by fastening elements 27C. In operation, the spacer element 26 is positioned over the threaded studs 56 of the wheel hub 52 and secure thereto with fastening elements 58 such as threaded nuts. Then, the sprocket 28 is attached to the threaded studs 27B of the spacer element 26, again using fastening elements 27C such as threaded nuts. As will be understood, the spacer element 26 will position the sprocket 28 so that it is brought into alignment with the idler 318, 376 and bogey wheels 300, 302, 306, 308 of the carriage 22. It is envisioned that the spacer element 26 may be integrally formed with the sprocket 28 itself, as a rearwardly extending flange, without departing from the spirit and scope of the invention.

In a preferred method of assembly, the sprocket 28 is attached to the spacer element 26 (or wheel hub 52 as the case may be) after the endless track 34 is loosely fitted about the carriage 22. With the preferred method, a first sprocket segment 30 is connected to the bottom of the spacer element 26 (or wheel hub 52). The wheel hub 52 is then rotated so that the first sprocket segment 30 moved to the apex of the carriage 22 assembly. Then, the second sprocket segment 32 is connected to the spacer element 26 (or wheel hub 52). Finally, the tensioning apparatus 330 is adjusted to remove residual slack in the endless track 34. As will be noted, the tensioning apparatus 330 allows the track assembly 20 to accommodate similar endless tracks that may be fabricated by manufactures other than the original manufacturer, or endless tracks that may be different or which may have different applications than the original flexible, endless tracks.

Figure 8:
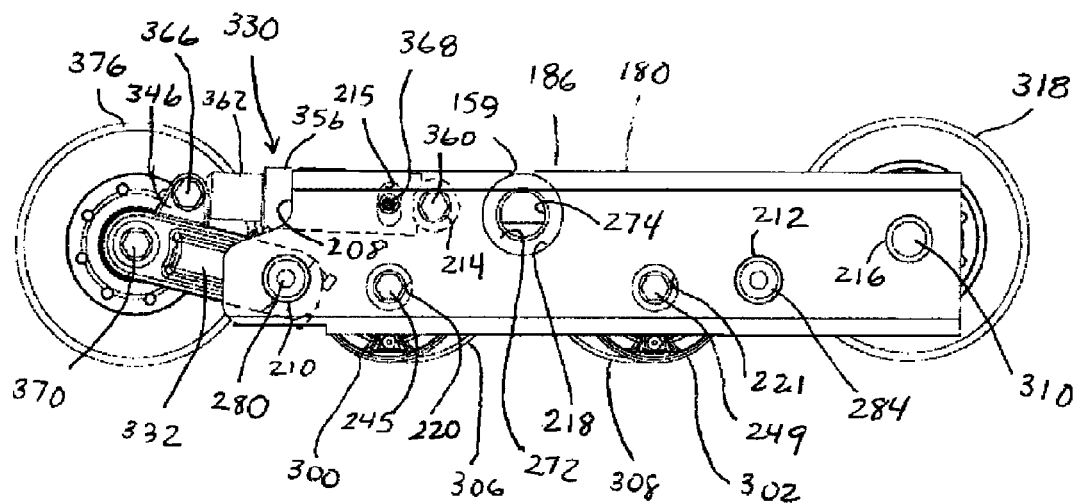
FIG. 8 is an inboard side elevation view of the carriage of FIG. 7.

A preferred carriage 22 of a track assembly unit 20 is shown in FIGS. 7-13. Generally, the carriage 22 comprises a main frame 180, an outrigger beam 290, and a plurality of support wheels 300, 302, 306, 308, 318 and 376 that are rotatably attached to the main frame 60 and the outrigger beam 170. The main frame 180 comprises a first or inboard side wall 188, a second or outboard side wall 190, a top wall 192 and a bottom wall 194, with the inboard 188, outboard 190, top 192, and bottom walls 194 connected to each other to form an elongated structure. As best shown in FIG. 8, the first or inboard side wall 188 is generally planar and has a first or external surface 200, a second internal surface 202, a first or forward end 204 and a second or rearward end 206. A side wall 188 includes a notch 208 at the first end 204, with the notch 208 providing access to a tensioning apparatus or mechanism 330 to be discussed later. In addition, side wall 188 includes a plurality of apertures that will be briefly discussed. Apertures 210, 212 that are configured to receive ends of transversely oriented struts 280, 284, which will be discussed later. An aperture 214 and a slot 215 are used in conjunction with the tensioning apparatus or mechanism 330. Aperture 216 is configured to receive an end of a shaft 310 that supports an idler wheel 318. A cutout 218 is configured to receive a sleeve 272 and a bushing 274 that receive a pivot pin 276. And, two apertures 220 provide access to front and rear bogey wheel bolts 245 and 249.

The second or outboard side wall 190 is similarly constructed, but with slight differences. As best shown in FIGS. 7, 9, 10 and 13, the second or outboard side wall 190 is generally planar and has a first or external surface 222, a second internal surface 224, a first or forward end 226 and a second or rearward end 228. A side wall 190 includes a notch 230 at the first end 226, with the notch 230 providing access to a tensioning apparatus or mechanism 330 to be discussed later. In addition, side wall 190 includes a plurality of apertures that will be briefly discussed. Apertures 232, 234 that are configured to receive transversely oriented struts 280, 284, which will be discussed later. An aperture 236 is used in conjunction with the tensioning apparatus or mechanism 330. Aperture 238 is configured to receive a shaft 310 that supports an idler wheel 318. A cutout 240 is configured to receive a sleeve 272 and a bushing 274 that receive a pivot pin 276. And, two recesses 242, 246 have apertures 244, 248 that receive shafts 245, 249 that rotatably support bogey wheels 300, 302.

The first and second side walls 188, 190 are generally parallel to each other and connected at their upper and lower edges to top 192 and bottom 194 walls, respectively. As with the first and second side wall, the top and bottom walls 192, 194 each include a first or exterior surface 250, 260 and a second or interior surface 252, 262. Together, the side 188, 190, top 192, and bottom 194 walls define an elongated structure, or main frame 180 having a first or forward end, a second or rearward end, and a middle section. The aforementioned walls 188, 190, 192, 194 also form a generally polygonally shaped exterior and a generally hollow interior similar to a tube or tunnel.

Figure 9:
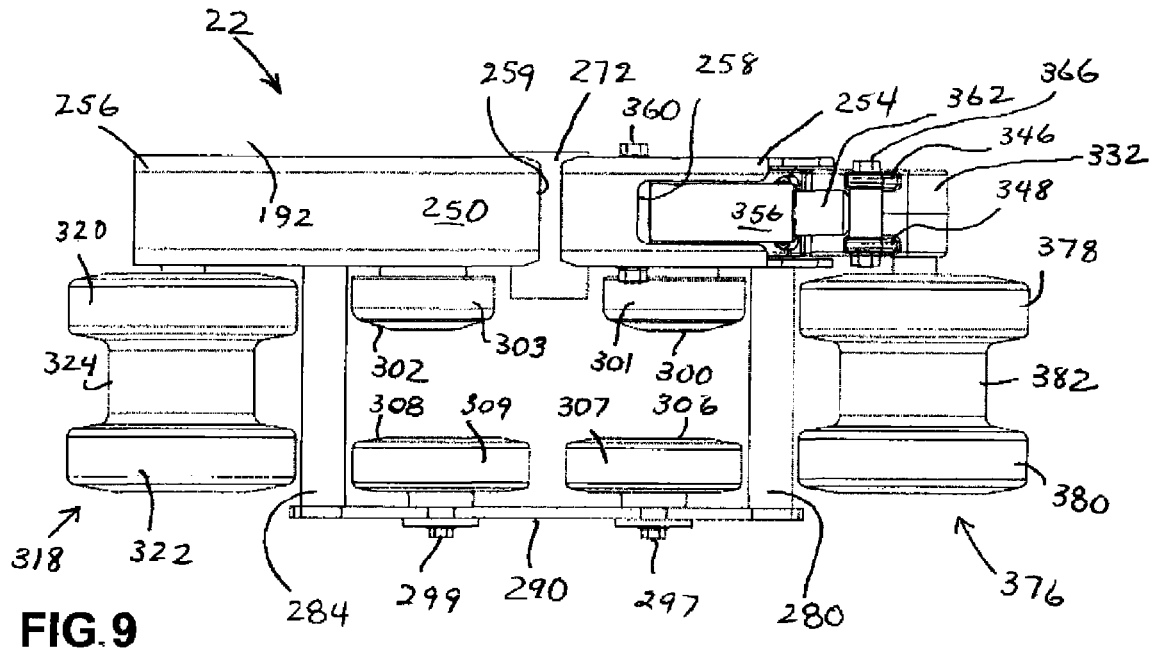
FIG. 9 is a top plan view of the carriage of FIG. 7.

Turning to FIG. 9, the top or upper wall 192 of the main frame 180 includes a first or external surface 250, a second or internal surface 252, a first or forward end 254, and a second or rearward end 256. As with the first and second side walls 188, 190, the top wall 192 includes a notch 258 at its forward end that is used in conjunction with the tensioning apparatus or mechanism 330. The top wall 192 also includes a transverse slot 159 that is in communication with the circular cutouts 218, 240 on the first and second side walls 188, 190, respectively.

Figure 10:
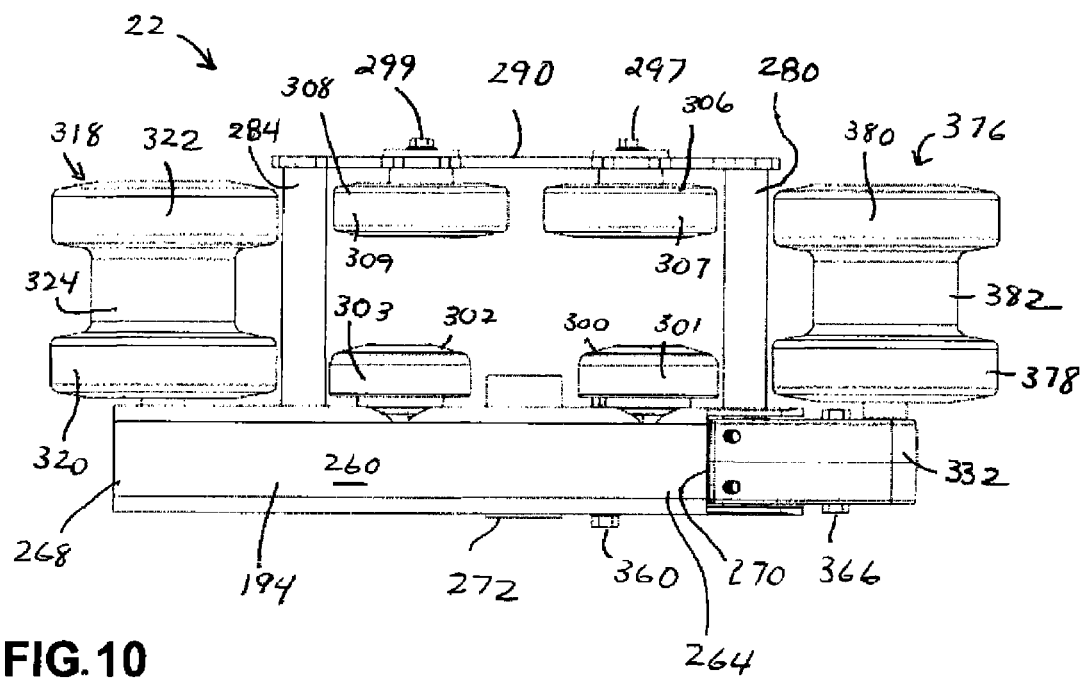
FIG. 10 is a bottom plan view of the carriage of FIG. 7.

The bottom or lower wall 194 depicted in FIG. 10 is similarly constructed. That is to say, the bottom or lower wall 194 includes a first or external surface 260, a second or internal surface 262, a first or forward end 264, and a second or rearward end 268. The bottom wall 194 includes a notch 270 at its first or forward end 264 that is used in conjunction with the tensioning apparatus or mechanism 330. Together, the notches 208, 230, 258, 270 in the sides, top and bottom walls 188, 190, 192, 194 at the first or forward end of the main frame 180 provide clearance and access space for the tensioning mechanism or apparatus 330.

The main frame 180 is provided with an outrigger beam 290 that is parallel to, and spaced from the external surface 222 of the second or outboard side wall 190. The beam 290 has a first end and a second end 292, 294 and a pair of apertures 296, 298 that receive fastening elements or pins 297, 299 that are used to rotatably attach a pair of outer bogey wheels 306, 308. The first and second ends 292, 294 of the beam 290 are connected to the main frame 180 by first and second struts 280, 294. More particularly, the first and second struts 280, 284 have first and second ends, respectively, with the first ends of the struts 280, 284 connected to the outrigger beam 290 and the second ends of the struts connected to the main frame 180. Preferably, the second ends of the first and second struts 280, 284 extend through the second or outboard side wall 190 and to the first or inboard side wall 188.

As shown, the carriage 22 is provided with a plurality of bogey wheels 300, 302, 306, 308, with each bogey wheel having a track contacting surface 301, 303, 307, 309 that rollingly engages the inner surface 36 of endless track 34. Generally, there a two sets of inner 300, 302 and outer bogey wheels 306, 308. As mentioned above, the inner bogey wheels 300, 302 are rotatably connected to the outboard side wall 190 of the main frame 180 by way of fastening elements such as shafts or pins 245, 249. Preferably the wheels 300, 302 are located between the struts 280, 284 and preferably at circularly shaped recesses 242, 246. The outer or outboard set of bogey wheels 306, 308 are rotatably connected to the outrigger beam 290 by way of fastening elements such as shafts or pins 297, 299, also preferably between the struts 280, 284 and preferably at an inner side of the beam 290. Optionally, the beam 290 may be provided with a strengthening washers for each bogey wheel 306, 308 attachment. As shown, the inner and outer bogey wheels 300, 302, 306, 308 are spaced apart from each other and define a space through which both portions of a drive sprocket 28 and projections of an endless track 34 may pass unencumbered. Preferably, the distance between the rotational axes of the inner bogey wheels 300, 302 is greater than the distance between the rotational axes of the outer bogey wheels 306, 308. Although the preferred number of bogey wheels per set is two, it is understood that each set could have more or less than two bogey wheels without departing from the spirit and scope of the invention.

Moving towards the rear of the carriage 22, and as best shown in FIGS. 9, 10, 11, and 13 the carriage 22 is provided with a shaft 310 that extends outwardly from the outboard side wall 190 of the main frame 180, and which is substantially parallel to the first and second struts 280, 284. As with the previously described struts 280, 284, the shaft 310 has first and second ends, with the second end of the shaft extending through the second or outboard side wall 190 and into aperture 216 of first or inboard side wall 188. A rear hub assembly 312, which includes a flange 314 with a plurality of mounting apertures 316, is rotatably mounted on shaft 310. A rear idler wheel 318 is attached to the rear hub assembly 312 using conventional fastening elements 319 such as threaded bolts. The rear idler wheel 318 includes an inner track contacting surface 320, an outer track contacting surface 322, and a guide channel 324 located between the inner and outer track contacting surfaces 320, 322. As will be understood, the guide channel 324 is configured and arranged to receive inwardly extending projections 37 of an endless track 34. Preferably, the inner and outer track contacting surfaces 320, 322 of the idler wheel 318 are in alignment with the inner and outer sets of bogey wheels 300, 302, 306, 308, respectively.

Figure 13:
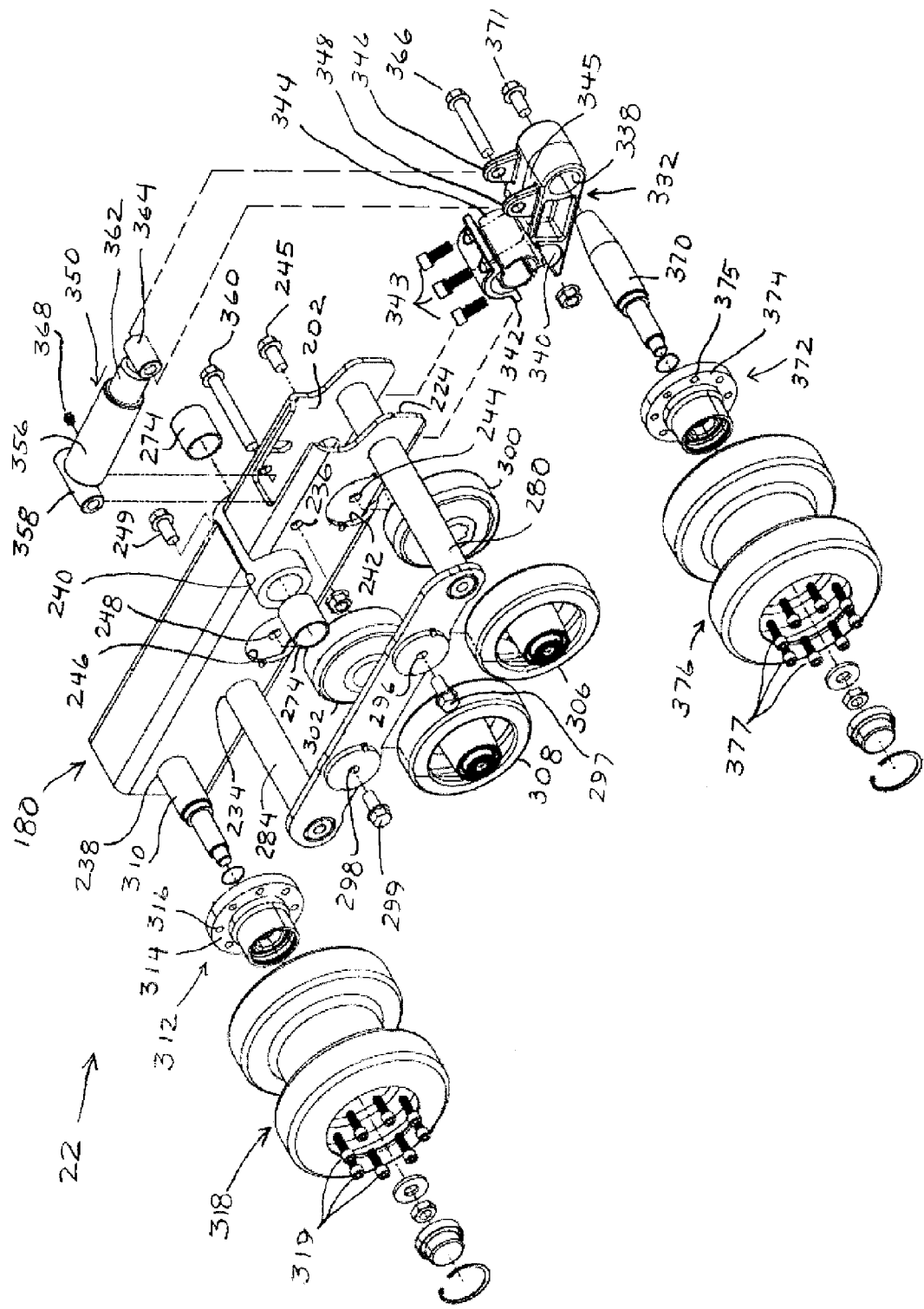
FIG. 13 is a partial, exploded, perspective view of the carriage of FIG. 7.

Continuing on towards the front of the carriage 22, as best shown in FIG. 13, a tensioning/shock absorbing apparatus or mechanism 330 is connected to the main frame 180 so that it is in alignment therewith. Generally, the tensioning/shock absorbing apparatus 330 comprises a pivot arm 332 and an actuator or tensioning mechanism 350, with the arm 332 and the actuator 350 configured to move a front idler wheel 376. The pivot arm or arm 332 comprises a generally rectangularly shaped body having a width, a thickness and length. More specifically, the first end of the arm 332 is provided with an aperture 338 that receives an end of a shaft 370, and which is secured to the arm by a fastening element 371. The shaft 370 rotatably supports a front hub assembly 372 that includes a flange 374 with a plurality of mounting apertures 375. A first or front idler wheel 376 is attached to the front hub assembly 372 using conventional fastening elements 377 such as threaded bolts. The first or front idler wheel 376 includes an inner track contacting surface 378, an outer track contacting surface 380, and a guide channel 382 located between the inner and outer track contacting surfaces 378, 380. As will be understood, the guide channel 382 is configured and arranged to receive inwardly extending projections 37 of an endless track 34. Preferably, the inner and outer track contacting surfaces 378, 380 of the idler wheel 376 are in alignment with the inner and outer sets of bogey wheels 300, 302, 306, 308, respectively.

The second end of the pivot arm 332 has a width that is less than the distance between the interior surfaces 202, 224 of the inboard and outboard vertical side walls 188, 190. The second end 206 of the pivot arm 332 includes a bed 340 and a removable cap 342 that may be attached thereto by fastening elements 343 such as threaded screws. Preferably, the bed 340 and the cap 342 have arcuately shaped surfaces that complement each other so that the pivot arm 332 may be connected to the portion of the first or forward strut 280 that extends between the outboard and inboard side walls 190, 188 of the main frame 180. Preferably, a bushing or bearing material 344 is interposed between the cap 342 and the bed 340 (of the pivot arm 332), and the first strut 280, so that the pivot arm 332 may rotate with less friction.

A preferred actuator or tensioning mechanism 350 generally comprises an elongated body having first and second ends, which can be extended and retracted relative to each other. The actuator 350 comprises a housing 356 and a piston 362 that is telescopically received in the housing 356 and which is movable relative thereto under the influence of internal pressure. The free end of the housing 356 is provided with a transversely oriented pineye mount 358. The pineye mount 358, which has a length that is less than the distance between the inner surfaces 224, 202 of the outboard and inboard side walls 190, 188 of the main frame 180, is configured to be received within the main frame and rotatably secured thereto with fastening element 360 such as a threaded bolt and nut. The free end of the piston 362 is also provided with a transversely oriented pineye mount 364, which is rotatably connected to a pair of flanges 246, 248 that extend from the upper surface 345 of pivot arm 332. The actuator or tensioning mechanism 350 is located above the pivot arm 332. When the actuator or tensioning mechanism 350 is extend, the pivot arm 332 will be rotated downwardly and when the actuator or tensioning mechanism is retracted, the pivot arm will be rotated upwardly. This changes the location of the first or forward idler wheel 376, and hence the total circumference about which an endless track 34 is engirded. Equally important, the actuator or tensioning mechanism 350 can act as a shock absorber for the first or front idler wheel 376. Preferably, the actuator 350 is a grease cylinder having a grease fitting 368 that extends through the slot 215 in the inboard or first vertical wall 188 of the main frame 180. However, it will be understood that other actuators may be used without departing from the spirit and scope of the invention. For example, the actuator or tensioning mechanism could be a hydraulic cylinder, a pneumatic cylinder, one or more spring elements, or the like.

The foregoing is considered as illustrative only. Furthermore, since numerous modifications and changes will readily occur to those skilled in the art, the exact construction and operation shown and described is only an example of a preferred embodiment. The invention is defined by the following claims.

What is claimed is:

1. A track assembly in combination with a self-propelled vehicle having a plurality of power driven tires or support wheels, with each tire or support wheel removably connectable to a wheel hub of a spindle housing, the track assembly comprising:
   an attachment assembly, having a portion that is connectable to the spindle housing of the vehicle, and a portion that is connectable to a carriage;
   the carriage comprising:
      a main frame having a first end and a second end, the main frame pivotally connected to the attachment assembly;
      a first idler wheel rotatably connected to the first end of the main frame;
      a second idler wheel rotatably connected to the second end of the main frame,
      a first bogey wheel rotatably attached to the main frame;
      a beam spaced from and generally parallel to the main frame; and
      a second bogey wheel rotatably attached to the beam, with the first and second bogey wheels being substantially parallel to each other and defining an open space therebetween, the first and second bogey wheels located between rotational axes of the first and second idler wheels;
   a sprocket operatively connected to the vehicle; and,
   an endless track having an inner surface and an outer surface, the track installed about the carriage so that an inner surface contacts the plurality of idler and bogey wheels and the sprocket.

2. The combination of claim 1, wherein the carriage is pivotally connected to the attachment assembly.

3. The combination of claim 1, wherein one of the first or second idler wheels is movably positionable relative to the main frame of the carriage.

4. The combination of claim 3, further comprising an actuator, the actuator configured to move one of the said first or second idler wheels with respect to the main frame.

5. The combination of claim 3, further comprising an actuator having two ends, with one end connected to the main frame and with the other end connected to a pivot arm, with the pivot arm configured and arranged to rotatably support the other of the first or second idler wheels.

6. The combination of claim 1, wherein one of the first or second idler wheels is pivotally connected to the main frame.

7. The combination of claim 1, wherein a portion of the sprocket is located in the space defined by the first and second bogey wheels.

8. The combination of claim 1, wherein the sprocket is operatively connected to the wheel hub of the vehicle.

9. The combination of claim 1, wherein the spindle connectable portion of the attachment assembly comprises: a first section and a second section, with the first and second sections configured and arranged to substantially encircle a periphery of the spindle housing.

10. The combination of claim 1, wherein the spindle connectable portion of the attachment assembly is operatively connectable to a trunnion that connects the spindle housing to an axle housing.

11. The combination of claim 1, wherein the portion of the attachment assembly that is connectable to the carriage includes a downwardly extending flange having a transverse aperture, and wherein the carriage includes a transverse aperture, the combination further comprising a pivot pin configured and arranged to be insertable through the transverse apertures of the downwardly extending flange and the carriage to connect the attachment assembly to the carriage.

12. The combination of claim 11, wherein the transverse aperture of the carriage extends through the main frame of the carriage and not the beam.

13. A carriage suitable for use with a track assembly used to convert a self-propelled wheeled vehicle into a tracked vehicle, the carriage comprising:
   a main frame having a first end, a second end, a first side wall and a second side wall, with the first and second side walls spaced apart and generally parallel to each other;
   a first idler wheel rotatably connected to the first end;
   a second idler wheel rotatably connected to the second end,
   a first bogey wheel rotatably attached to the main frame;
   a beam having two ends, with one end of the beam connected to a strut that is connected to the first and second side walls of the main frame, the beam spaced from and generally parallel to the main frame, and
   a second bogey wheel rotatably attached to the beam, with the first and second bogey wheels being substantially parallel and defining an open space therebetween, the first and second bogey wheels located between rotational axes of the first and second idler wheels.

14. The carriage of claim 13, further comprising a sleeve that extends through the first and second side walls, the sleeve configured and arranged to rotatably receive a pivot pin.

15. The carriage of claim 13, wherein the main frame further comprises a top wall, with the top wall generally orthogonally oriented with respect to the first and second side walls.

16. The carriage of claim 15, wherein the main frame further comprises a bottom wall, with the bottom wall generally parallel to the top wall.

17. The carriage of claim 13, further comprising a tensioning arm having a portion that is operatively connected to a section of the strut that resides between the first and second side walls, and another portion that is operatively connected to the first idler wheel.

18. The carriage of claim 17, further comprising an actuator operatively connected to the main frame and the tensioning arm.

19. The carriage of claim 18, wherein the actuator is selected from the group consisting of a grease cylinder and a hydraulic cylinder.

20. The carriage of claim 13, wherein the other end of the beam is connected to a second strut that is connected to the first and second side walls of the main frame.

21. The carriage of claim 13, wherein the idler wheels extend from one side of the main frame.

22. The carriage of claim 13, wherein each of the idler wheels includes first and second track contacting surfaces and a guide channel, with the guide channels of the idler wheels parallel to the longitudinal axis of the main frame.

23. The carriage of claim 13, wherein the first bogey wheel has a track contacting surface that is in alignment with a first track contacting surface of each of the idler wheels.

24. The carriage of claim 13, wherein the second bogey wheel has a track contacting surface that is in alignment with a second track contacting surface of each of the idler wheels.

25. The combination of claim 1, wherein the main frame of the carriage includes a transverse sleeve that is configured and arranged to receive a pivot pin used to operatively connect the carriage to a spindle housing of the vehicle.

26. A track assembly in combination with a self-propelled vehicle having a plurality of power driven tires or support wheels, with each tire or support wheel removably connectable to a wheel hub of a spindle housing, the track assembly comprising:
   an attachment assembly, having a portion that is connectable to the spindle housing of the vehicle, and a portion that is connectable to a carriage, with the portion that is connectable to the spindle housing of the vehicle comprising a first section and a second section, with the first and second sections configured and arranged to substantially encircle a periphery of the spindle housing;
   the carriage comprising:
      a main frame having a first end and a second end;
      a first idler wheel rotatably connected to the first end of the main frame;
      a second idler wheel rotatably connected to the second end of the main frame,
      a first bogey wheel rotatably attached to the main frame;
      a beam spaced from and generally parallel to the main frame; and
      a second bogey wheel rotatably attached to the beam, with the first and second bogey wheels being substantially parallel to each other and defining an open space therebetween, the first and second bogey wheels located between rotational axes of the first and second idler wheels;
   a sprocket operatively connected to the vehicle; and,
   an endless track having an inner surface and an outer surface, the track installed about the carriage so that an inner surface contacts the plurality of idler and bogey wheels and the sprocket.

27. A track assembly in combination with a self-propelled vehicle having a plurality of power driven tires or support wheels, with each tire or support wheel removably connectable to a wheel hub of a spindle housing, the track assembly comprising:
   an attachment assembly, having a portion that is connectable to the spindle housing of the vehicle, and a portion that is connectable to a carriage, wherein the portion that is connectable to the spindle housing is operatively connectable to a trunnion that connects the spindle housing to an axle housing;
   the carriage comprising:
      a main frame having a first end and a second end;
      a first idler wheel rotatably connected to the first end of the main frame;
      a second idler wheel rotatably connected to the second end of the main frame,
      a first bogey wheel rotatably attached to the main frame;
      a beam spaced from and generally parallel to the main frame; and
      a second bogey wheel rotatably attached to the beam, with the first and second bogey wheels being substantially parallel to each other and defining an open space therebetween, the first and second bogey wheels located between rotational axes of the first and second idler wheels;
   a sprocket operatively connected to the vehicle; and,
   an endless track having an inner surface and an outer surface, the track installed about the carriage so that an inner surface contacts the plurality of idler and bogey wheels and the sprocket.

\* \* \* \* \*

UNITED STATES PATENT AND TRADEMARK OFFICE
CERTIFICATE OF CORRECTION

| | | |
|---|---|---|
| PATENT NO. | : 8,245,800 B2 | Page 1 of 1 |
| APPLICATION NO. | : 12/330689 | |
| DATED | : August 21, 2012 | |
| INVENTOR(S) | : Hansen | |

It is certified that error appears in the above-identified patent and that said Letters Patent is hereby corrected as shown below:

In the specification

Col. 1, line 25, "be surfaced," should read --been surfaced,--

Col. 9, line 31, "there a," should read --there are,--

Signed and Sealed this
First Day of March, 2016

Michelle K. Lee
*Director of the United States Patent and Trademark Office*